United States Patent [19]

Ribich

[11] 3,775,819
[45] Dec. 4, 1973

[54] ROTATING CUTTING TOOL

[75] Inventor: Thomas A. Ribich, Cleveland, Ohio

[73] Assignee: The Weldon Tool Company, Cleveland, Ohio

[22] Filed: Dec. 14, 1972

[21] Appl. No.: 315,021

Related U.S. Application Data

[63] Continuation of Ser. No. 174,058, Aug. 23, 1971, abandoned, which is a continuation-in-part of Ser. No. 31,594, April 24, 1970, abandoned, which is a continuation-in-part of Ser. No. 822,971, May 8, 1969, abandoned.

[52] U.S. Cl. ............................................. 29/103 A
[51] Int. Cl. .............................................. B26d 1/12
[58] Field of Search ........................... 29/103, 103 A

[56] References Cited
UNITED STATES PATENTS

| | | | |
|---|---|---|---|
| 3,117,366 | 1/1964 | Castor, Sr. | 29/103 |
| 3,133,339 | 5/1964 | Ribich | 29/103 |
| 3,548,476 | 12/1970 | Cave et al. | 29/103 |

*Primary Examiner*—Harrison L. Hinson
*Attorney*—Woodling, Krost, Granger & Rust

[57] ABSTRACT

A rotatable milling cutter having a plurality of helically extending teeth each of which has a cutting face side and a trailing side interconnected by a relieved surface which extends at an acute angle to a tangent line which extends through a cutting edge defined by the intersection of the cutting face side and the relieved surface. Wall means are provided on the cutting face side of the teeth which define a plurality of generally axially spaced pockets or indentations recessed from the cutting face side toward the trailing side. This construction presents a cutting edge which when geometrically developed is a generally regularly shaped reoccurring curve which has a large pitch with respect to amplitude and this cutting edge is the edge which is presented to the work which the cutter operates upon. The construction of the present invention also includes the provision of flattening the high point or high area of a portion of the above referred to reoccuring curve and the flattened portion is designed to be generally parallel to the axis of the tool. The present construction also improves the strength characteristics of the teeth at their extreme end faces.

31 Claims, 19 Drawing Figures

PATENTED DEC 4 1973 3,775,819

INVENTOR.
THOMAS A. RIBICH
BY
Woodling Krost Granger & Rust
Attys

INVENTOR.
THOMAS A. RIBICH

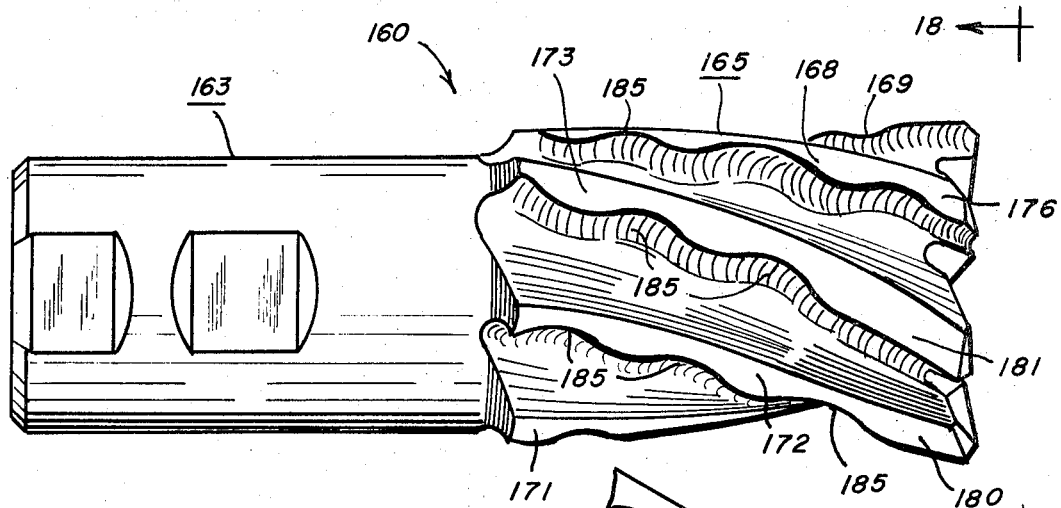

ROTATING CUTTING TOOL

This application is a continuation application of U. S. Pat. application Ser. No. 174,058 filed Aug. 23, 1971, and entitled "Rotating Cutting Tool," which in turn was a continuation-in-part application of U. S. Pat. application Ser. No. 31,594, filed Apr. 24, 1970, and entitled "Rotating Cutting Tool," which in turn was a continuation-in-part application of U. S. Pat. application Ser. No. 822,971 filed May 8, 1969 and entitled "Rotating Cutting Tool", all now abandoned.

U. S. Pat. No. 3,133,339 issued May 19, 1964 is an example of the prior art on this subject, however, the basic problem involved in this construction is not in the finished tool, which functions in the advantageous manner pointed out in this patent, but rather in the difficulties involved in producing (initially and in resharpening) the cutting edges on the tool. The cutting edge on this type of tool is produced by holding the tool in a relatively sophisticated and relatively expensive fixture which appropriately moves the tool, and more specifically the cutting edge thereof, relative to a grinding wheel. This produces the generally wavy shaped cutting edge disclosed in U. S. Pat. No. 3,133,339.

Commercial users of this tool and particularly small machine shops, usually find it financially advantageous to ship these tools back to the producer for resharpening, rather than expend money for the purchase of the aforementioned fixtures. This results in delay and other inherent disadvantages to the user of the tool.

It is therefore an object of this invention to provide a rotating cutting tool having a cutting edge of the type discussed hereinabove which cutting edge can be provided on the tool by relatively inexpensive equipment normally possessed by small establishments.

Another object of this invention is to provide such an improved tool wherein the generally wavy shaped cutting edge can be conveniently removed by conventional sharpening methods to produce the conventional cutting edge on such tools (such as end mills, etc.) wherein substantially all points on the cutting edge lie on a constant radius from the center line of the tool.

Another object of this invention is to provide a flat or substantially flat surface on the high areas of the wavy shaped cutting edge of the tool which flat portions are parallel to the tool axis and which will produce a substantially flat surface on a workpiece upon which it performs its intended function while still maintaining the chip breaking effect of the wavy edge.

Other objects and a fuller understanding of this invention may be had by referring to the following description and claims, taken in conjunction with the accompanying drawings, in which:

Figure 1:
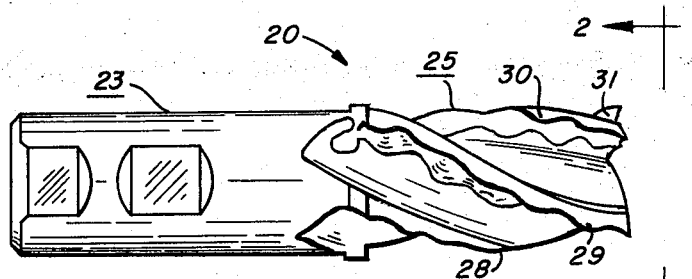
FIG. 1 is an elevational view of a tool constructed under the teachings of the present invention.
Figure 2:
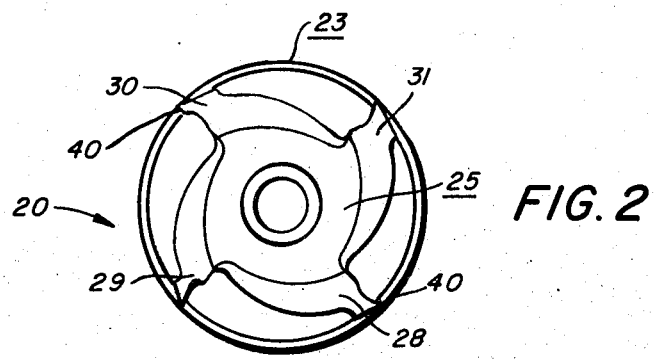
FIG. 2 is an enlarged view taken generally along the line 2—2 of FIG. 1.
Figure 3:
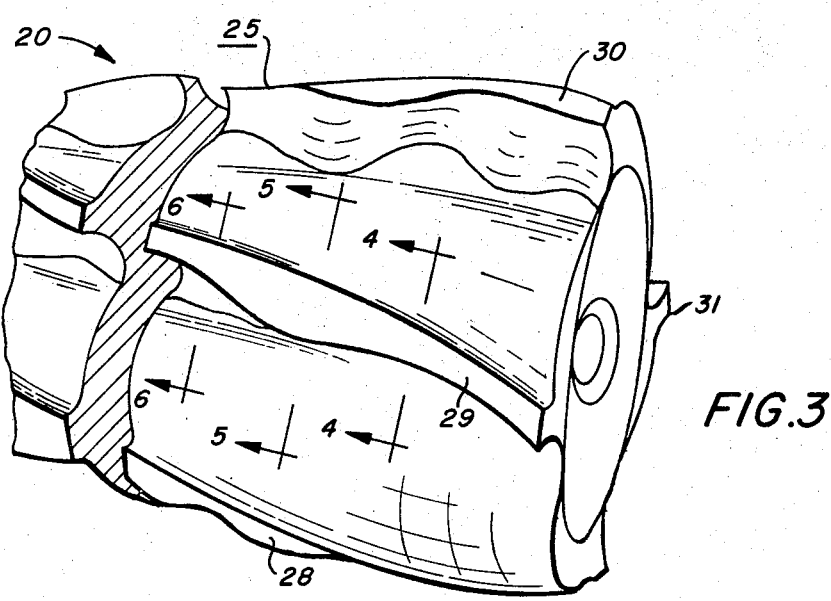
FIG. 3 is a still further enlarged fragmentary isometric view of the cutting end portion of the tool shown in FIG. 1.
Figure 4:
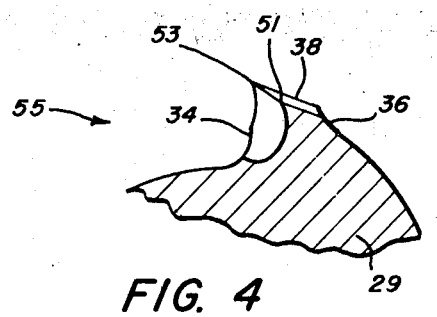
Figure 5:
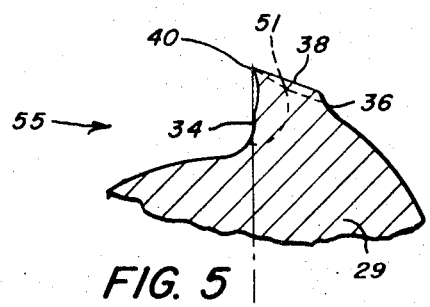
Figure 7:
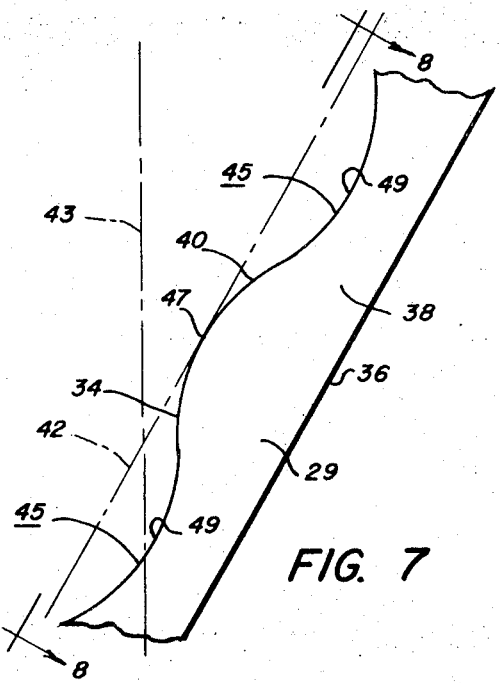
Figure 6:
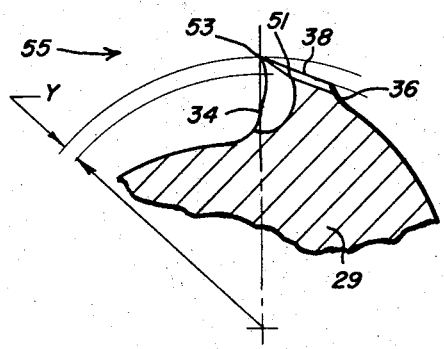
Figure 8:
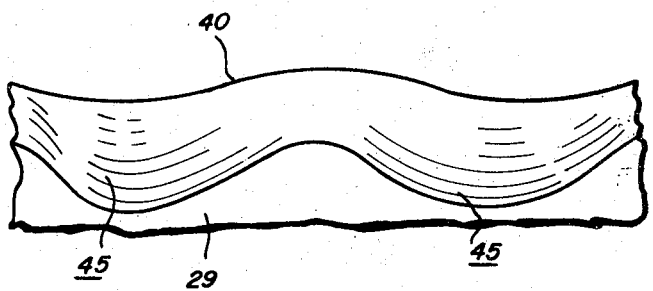
Figure 9:
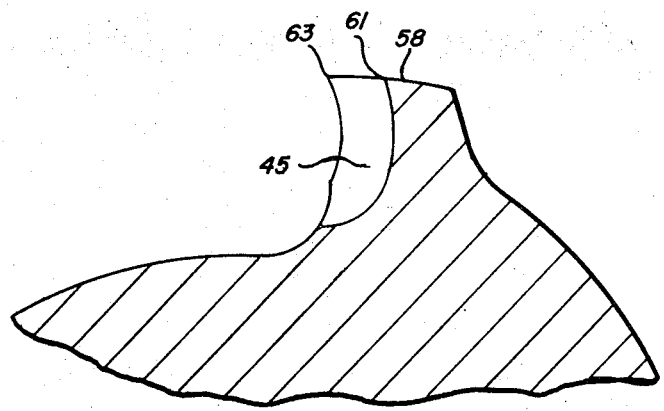
Figure 10:
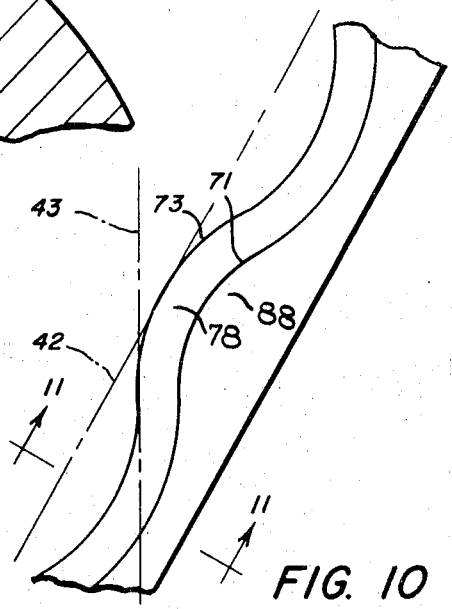
Figure 11:
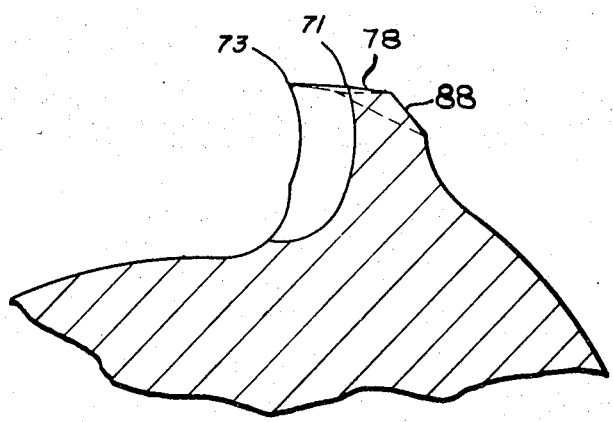
Figure 12:
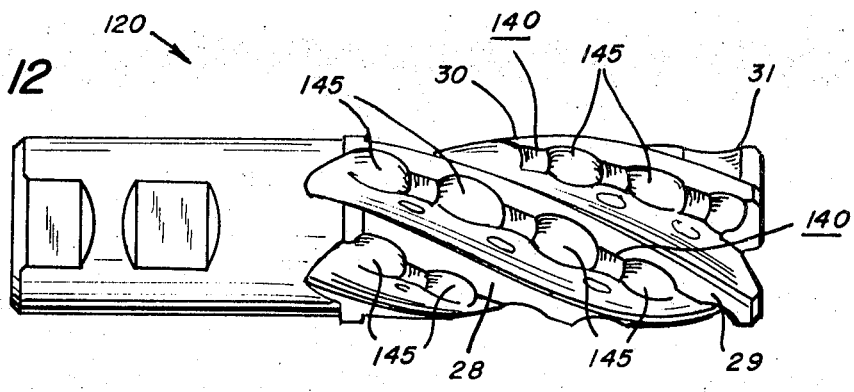
Figure 13:
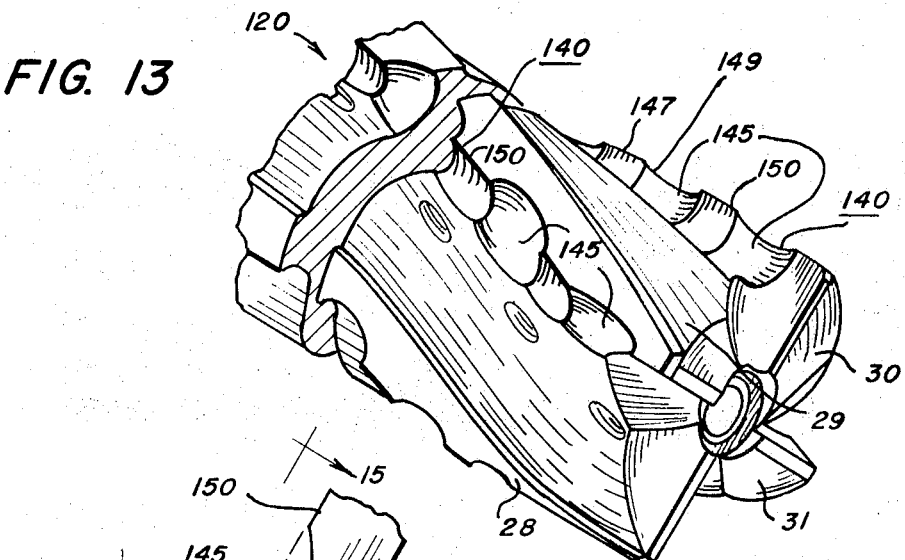
Figure 14:
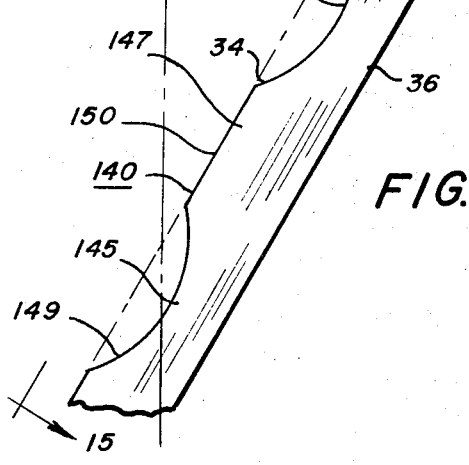
Figure 15:
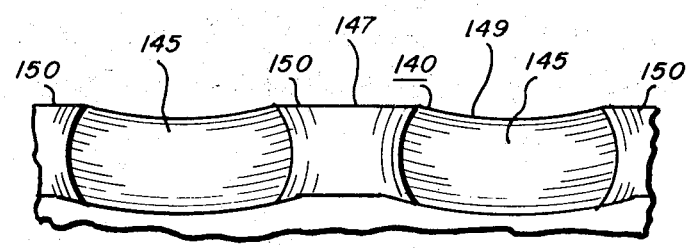
Figure 16:
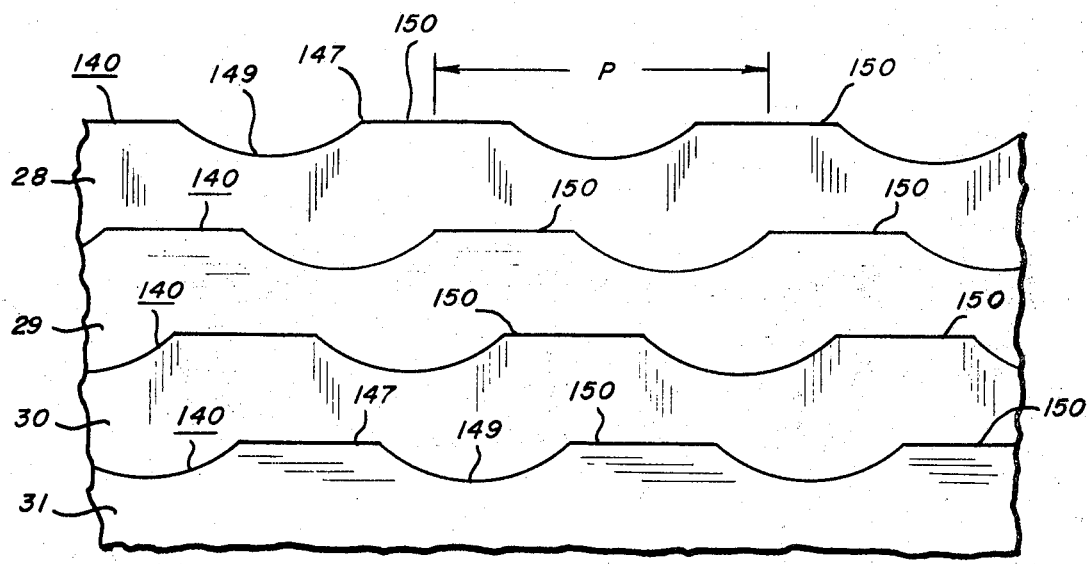

FIGS. 4, 5 and 6 are views taken along the respective lines 4—4, 5—5 and 6—6 of FIG. 3;

FIG. 7 is a somewhat schematic view (taken in the same direction as FIG. 1) of one of the teeth of the tool shown in FIGS. 1, 2 and 3;

FIG. 8 is a view taken generally along the line 8—8 of FIG. 7;

FIG. 9 is a view similar to FIG. 4 but showing the tool prior to the relief surface being ground on the tooth;

FIG. 10 is a view similar to FIG. 7 but showing the cutting edge being reground to produce a tool of this type with a conventional cutting edge or in other words with substantially all points on the cutting edge being on a substantially constant radius with respect to the axis of the tool;

FIG. 11 is a sectional view taken generally along the line 11—11 of FIG. 10 demonstrating generally the cross sectional appearance of the reground cutting edge shown in FIG. 10;

FIG. 12 is an elevational view of a modification of the tool shown in FIG. 1 and constructed under the teachings of the present invention;

FIG. 13 is an enlarged fragmentary isometric view of a portion of the tool shown in FIG. 12;

FIG. 14 is a somewhat schematic view similar to FIG. 7 showing one of the teeth of the tool shown in FIG. 12 and taken in a direction which is generally radial with respect to the axis of the tool;

FIG. 15 is a view taken generally along the line 15—15 of FIG. 14;

FIG. 16 is a representation of the cutting edges on each of the four teeth of the tool shown in FIG. 12 and showing the axial offset of the high and low areas of each of the cutting edges with respect to each other;

FIG. 17 is an elevational view of a modification of the tools shown in FIGS. 1 and 12 and constructed under the teachings of the present invention;

FIG. 18 is an end view of the tool shown in FIG. 17 looking in the direction of the arrows 18—18 of FIG. 17; and FIG. 19 is a development of the six teeth shown on the tool of FIGS. 17 and 18.

The preferred embodiment of the present invention will be demonstrated and described in connection with an end mill indicated generally by the reference numeral 20 and it will be readily appreciated by those skilled in the art that the invention is readily adapted to rotating tools generally designated as milling cutters. The end mill 20 has an improved cutting action as described hereinabove and as seen, includes in combination a shank end portion 23 and a cutting end portion 25 and these two portions are produced from one integral piece of metal as is conventional in the art. The cutting end portion 25 comprises a plurality of teeth specifically four in number in the present embodiment, and these teeth have been identified by the reference numerals 28, 29, 30 and 31. The teeth as shown extend in a generally helical direction with the helix angle being conventionally measured with respect to the axis of the tool. The helix angle in the embodiment shown is approximately 30°. Each of the teeth are identical in construction and only one of the same will be described specifically herein. Each of the teeth is provided with what will be referred to as a cutting face side 34, a trailing side 36, and a land surface 38 which extends between and connects the sides 34 and 36. The intersection of the cutting face side 34 and the land surface 38 comprises and forms the cutting edge 40 of the end mill.

In the conventional design of the straight sided end mill, the cutting edges extend in the helical direction around the axis of the tool with the cutting edges being generally on a substantially constant radius with respect to the axis of the tool. It is true of course that in this art there are what are commonly referred to as tapered end mills wherein the cutting edge of each tooth has a constantly increasing radius with respect to the axis of the tool as the edge extends from the point of the tool to the shank end portion. However, even in this type tool, corresponding portions of each of the cutting edges are on the same radius which increases in a constant manner from the point of the tool toward the shank end. It will also be appreciated by those skilled in the art that there are such things as "straight-fluted" tools of this type wherein the teeth do not extend in the helical direction, but extend in a manner parallel to the axis of the tool. All of these enumerated types of tools are susceptible of being constructed in accordance with the teachings of the present invention.

FIG. 7 is a somewhat schematic illustration of one of the teeth 29 taken in the same direction as FIG. 1 and the conventional configuration of the tooth would be that defined between the line 36 representing the trailing side and the dot-dash line 42. The axis of the tool 20 is indicated by the reference numeral 43. The present invention includes the provision of wall means on the cutting face side of each of the teeth which defines a plurality of axially spaced indentations 45 which as noted are recessed toward the trailing side 36 (from line 42) whereby the cutting edge 40 when viewed in the generally radial direction of the end mill(FIG. 7) defines a curve with high areas 47 and low areas 49 with the low areas being closer to the trailing side 36. Another way of describing the curve in this particular embodiment is to refer to it as a smooth and continuous curve somewhat on the order of or approaching a sine wave in configuration. The indentations 45 are produced by metal removal from the conventional tooth configuration by appropriately moving an end mill and the present tool relative to each other.

FIGS. 4, 5 and 6 are views taken along corresponding positions of the land 29 in FIG. 3 and show the cross sectional design of the tooth at spaced axial positions. The previously identified land surface 38 is seen in FIG. 4 and shows thereon the lowest point on the cutting edge 40 which is identified by the reference numeral 51. This point 51 is located on one of the low areas 49 previously discussed which is produced as a result of one of the indentations 45. One of the highest points on the cutting edge 40 is also seen in this view and has been identified by the reference numeral 53. It will therefore be observed from this view that the point 51 is located on a smaller radius with respect to the axis of the tool than is point 53. There is therefore produced, as viewed in the direction of the arrow 55 in FIGS. 4, 5 and 6, a series of highs and lows interconnected by intermediate points to present a cutting edge 40 as seen in FIG. 8. This is the cutting edge which presents itself to the work upon which it is to perform its intended function. The Y distance in FIG. 6 is the amplitude dimension shown in FIG. 8.

It will therefore be apparent with the design shown in FIGS. 4, 5 and 6, that when the cutting edge 40 becomes dull, all that need be done is to regrind the land surface 38 as shown in FIGS. 4, 5 and 6 in a conventional manner to resharpen edge 40.

FIG. 9 is a view similar to FIG. 4 but showing the end mill blank with the indentations 45 but before the relieved land surface 38 has been produced thereon. It will therefore be seen in this configuration that the land surface 38 now identified as 58, extends as the surface of a cylinder whose radius extends from this surface to the center line of the tool. In this construction a point 63 which corresponds to point 53 in FIG. 4, and a point 61 which corresponds to point 51 in FIG. 4, are both seen to lie on the circumference of this hereinabove described cylinder. By grinding the relieved land surface 38 on this blank, the construction of FIG. 9 is converted to that shown in FIGS. 4, 5 and 6. The blank of FIG. 9 can also be converted to the construction of FIGS. 10 and 11. The blank has utility and invention as well as the construction of FIGS. 1 through 8.

FIGS. 10 and 11 show the construction of the tool of the present invention when it is desired to produce a cutting edge which is conventional in nature in that the edge and substantially all points thereon lie on a constant radius from the center of the tool. In order to accomplish this end result it is necessary to regrind the tool in a manner known to those skilled in the art so as to remove the high points and the low points identified by the numerals 51 and 53 in FIGS. 4, 5 and 6 so that these points now lie on the same radius with respect to the center line of the tool. These points are identified by the reference numerals 71 and 73 in FIG. 10. The design of this construction is provided with a primary relief land surface 78 and secondary relief land surface 88 with the surface 88 making a greater angle with a tangent which extends through points 71 and 73 than does surface 78.

In the original blank as it is herein referred to as shown in FIG. 9, it will be seen that the land surface 58 is formed as the arc of a circle and the land surface 78 which is finally ground onto the land extends generally as a chord or a portion of a chord of this circle.

As a result of the present construction, it will be seen by those skilled in the art that the shape of the cutting edge 40 which is presented to the work and as seen in FIG. 8, is readily and economically produced utilizing conventional grinding methods when resorting to the teachings of the present invention. The cutting edge so produced has many advantages in that continuous and discontinuous "moon shaped" chips can be produced and it will be noted that entire length of a cutting edge is not presented to the work at one time thereby giving longer life and better cutting action to the tool. Another problem which is solved by the cutting edge of the present invention is that in slotting operations performed by conventional end mills, it has long been the problem that the end mill has a tendency to "walk" to one side or the other of the intended extent of the slot because of the inherent pulling power of the cutting edge depending on whether the tool is right or left handed. It will be seen that the cutting edge of the present invention is continuously passing from a left-handed to a right-handed direction as it goes through the high and low points on the cutting edge curve. As a result it appears that the present cutting edge design has the inherent capability of avoiding the inherent problems, for example, in slotting operations encountered by conventional end mill designs. The other advantages initially pointed out in the specification are also accomplished by the present specification.

The high and the low points on the cutting edges of the other teeth 29, 30 and 31 are placed out of phase with each other so as to provide a continuous and consistent cutting operation as the tool rotates and moves in a feed direction relative to a workpiece. In other words, the cutting edge 40 seen in FIG. 8 on flute 29 has a series of high areas or points axially spaced from each other and the distance between these high points is known as the pitch. The high points on edges 40 on teeth 28, 30 and 31 are axially offset with respect to each other and with respect to tooth 29. For the sake of example if the pitch of the high points on edge 40 of tooth 29 is one-fourth inch, then corresponding high points on teeth 28, 30 and 31 are progressively spaced apart one-sixteenth inch. This produces a spacing of one-sixteenth inch between adjacent high points.

The tool of the present invention which is illustrated in FIGS. 12 through 16 will be identified by the same reference numerals utilized in describing the tool of FIGS. 1 through 8 and different reference numerals will be utilized only in describing those specifc changes which have been incorporated into the modified tool. Since there are structural changes in the tool of FIGS. 12 through 16 over the previously described tool, the tool in general will be identified by the reference numeral 120. The change in construction comes about in the indentations or pockets 145 which are produced by metal removal from the conventional tooth configuration by the appropriate movement of an end mill relative to the end mill blank. This is best observed by referring specifically to FIGS. 14 and 15. FIG. 14 is taken in what may be referred to as a radial direction of the tool shown in FIG. 12. The axis of the tool, however, has been shifted approximately 90°. As seen in FIG. 14, the pockets or indentations 145 are produced by a metal removal tool and these pockets or indentations are axially spaced in a manner similar to that shown in FIG. 7. The pockets are produced in such a manner as to recess the cutting face side 34 of the tooth toward the trailing side 36. The difference in FIG. 14 from FIG. 7 is brought about by the slightly different movement of the metal removing tool. The cutting edge 140, which is produced as seen in FIGS. 14, 15 and 16 differs because the metal removing tool is maneuvered in a slightly different direction when producing the high areas 147 as distinguished from the low areas 149. It will be seen that the tool is maneuvered so as to produce flat portions or surfaces 150 on the top of the high areas.

FIG. 15 is a view taken generally along the line 15—15 of FIG. 14 and it will be noted that when the high areas 147 of the cutting edge 140 are flattened, that the high areas 147 as viewed in the direction of FIG. 15 are also flattened. The direction of the view of FIG. 15 is basically the direction which the cutting edge occupies as it approaches a workpiece upon which it is to accomplish its intended function. It will thus be seen that as a given cutting edge 140 makes a pass through the workpiece, it will produce a cutting effect upon the workpiece which has a surface which is complementary to the flat surface 150 of the cutting edge. A portion of the remainder of the cutting edge 140 as it proceeds from the high area 147 to the low area 149 will produce a cutting effect which will also be complementary to the rest of the curve of the cutting edge depending upon the feed rate at which the tool is being fed into the workpiece.

FIG. 16 is a representation of the axial position of the high areas and low areas 147 and 149 on each of the cutting edges 140 on the teeth 28, 29, 30 and 31. As will be seen in FIG. 16, there are shown teeth 28, 29, 30 and 31, and it will be seen that the high areas and low areas on each of the curves are offset axially with respect to each other. It will be specifically noted that the flat surfaces 150 of the cutting edges 140 on each of the teeth is progressively axially offset with respect to an adjacent cutting edge so that the tool, as it makes a cutting pass through a workpiece will produce a finished surface which is complementary to the flat surfaces 150. By overlapping the flat surfaces on adjacent cutting edges, there is produced a continuous finished cutting surface in an axial direction which is parallel to the axis of the tool. The advantage of this particular construction over the tool shown in FIGS. 1 through 8 is that many times the tolerance specification for the finished surface is too close to be produced by the tool of FIGS. 1 through 8 (to produce an acceptable finish) because of the variations in the high areas 47 as compared to the low areas 49 as viewed in FIG. 8. The design, best shown in FIGS. 14, 15 and 16, therefore produces a finished surface on the workpiece which does not have the variations therein produced by the curved high areas 47 as seen in FIGS. 7 and 8 but rather has a finished surface which is parallel to the axis of the cutting tool because of the flat surfaces 150 which are designed into the high areas 147. The tool therefore has the inherent advantages of being able to break up chips, yet which can function to produce a finished surface which is parallel to the axis of the cutting tool. Additionally, the device of FIGS. 12 through 16 can be utilized to produce a continuous chip if desired depending upon the rate at which the tool is fed into the workpiece. The pitch distance of adjacent high areas 147 is indicated by P in FIG. 16 and it will be seen that the axial distance of a flat surface 150 multiplied by the number of cutting edges (four in this case) is at least as great as the pitch distance so that a continuous and uninterrupted smooth surface is produced on the workpiece. As seen from FIG. 16 the flat surfaces on edges 140 of teeth 29, 30 and 31 will cut or machine any material missed by the low area 149 on edge 140 of tooth 28. The curve defined by the cutting edge 40 in FIGS. 6 and 7 can be referred to as generally sinusoidal.

It will be noted from a review of the drawings and description of the invention hereinabove and particularly FIGS. 1, 2, 3, 12 and 13, that the teeth (for example, 28, 29, 30 and 31) at their extreme end faces have varying physical size and as a result, the forward end portions of the teeth have varying strength characteristics. This results from the fact that the indentations (45 or 145 in FIGS. 7 and 14, respectively) on adjacent teeth are axially offset with respect to each other and the extreme end of a tooth may fall either in the low part of an indentation or on the high point thereof or in between the two. As the indentations are out of phase with each other, the distances from the last indentation of each tooth to the forward end thereof vary from tooth to tooth. This results in a lack of uniformity in strength characteristics of the several teeth at the forward end face of the tool.

FIGS. 17, 18 and 19 illustrate an end mill 160 which has a construction which obviates the immediately above mentioned difficulties and structural deficiencies. This construction and feature is also applicable to all of the embodiments of the invention which are shown in FIGS. 1–16. For simplicity in illustration, this construction or feature is shown as applied only to FIGS. 17, 18 and 19.

The end mill 160 includes a shank end portion 163 and a cutting end portion 165 which includes, by way of example, six teeth 168, 169, 170, 171, 172 and 173. These teeth, as in the other embodiments, have a cutting face side which has a constant positive radial rake angle or relationship with respect to the tool axis. This relationship is best illustrated and seen in FIGS. 4 through 6. FIG. 19, which is a development of the six teeth on the tool of FIGS. 17 and 18, best shows the discussed inventive concept of this modification. The respective teeth 168–173 are provided with helically extending forward end portions 176–181 which do not include pockets or indentations (like 45 or 145 in FIGS. 7 and 14, respectively) but extend on a constant helix for a given axial distance from the extreme end of the tool. It will be seen that end portion 176 of tooth 168 is the shortest portion with respective end portions 177, 178, 179, 180 and 181 of succeeding teeth being successively longer than end portion 176. These lengths are dictated by the offset between respective indentations, (all of which indentations have been identified by the reference numeral 185) and the number of teeth on the tool. The indentations 185 are identical with indentations 45 and 145, and the cutting face and edges on teeth 168–173, are the same as, those appearing on the tools of FIGS. 1–11 from the first indentation 185 at the forward end of the tool back to the shank end portion 163. The cutting face and edges on portions 176–181 are best seen in the end view of FIG. 18.

The axial length of portion 176, or in other words the shortest length of conventional tooth helix, has been found to be ideally one-eighth of the maximum outside diameter (O.D.) of the cutting end portion of the tool. This means that if the O.D. at the cutting edges is 1½inches, the axial length of portion 176 should be preferably on the order of three-sixteenth inch. It has been found, however, that preferably the length of portion 176 may lie in the range of from one-sixteenth to one-fourth the O.D. of the cutting end portion 165, with the most preferred at said ratio of one-eighth. It will thus be seen from FIG. 17 and the end view of FIG. 18 that the portions of all of the teeth 168 through 173 at their extreme forward ends of the cutting tool are all of the same physical character and strength and with variations of construction in the several teeth adjacent the forward end portion minimized.

This particular construction simplifies the addition of a chamfer 187 (FIG. 18) to remove the sharp termination of each of the peripheral cutting edges where they meet the end teeth. The same is true when corner cutting radii are required due to workpiece specifications. This construction is also advantageous when performing axial gashing operations on the extreme end of tools, especially the end center cutting chip breaker type.

As mentioned hereinabove, all of the embodiments of the tools show and illustrate that the cutting face side of each tooth has a constant positive radial rake angle or relationship with respect to the tool axis. This terminology is well understood by those skilled in the art. However, it might be further explained by saying that the rake is positive if a tooth cutting face surface trails its cutting edge in rotation or when a tooth cutting face surface lies on a radial line which, if extended toward the tool axis would pass behind the axis in respect to the cutting direction of rotation.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A milling cutter blank having an axis and including in combination a cutting portion, said cutting portion comprising a plurality of teeth, each said tooth having a cutting face side, a trailing side, and a land surface connecting the two aforementioned sides, said cutting face side having a constant positive radial rake relationship with the cutter axis, wall means on said cutting face side of said tooth defining a plurality of axially spaced indentations which are recessed toward said trailing side from a reference line at said cutting face side which line extends generally parallel to said tooth.

2. A milling cutter blank as claimed in claim 1, wherein said axially spaced indentations on said cutting face side of said tooth start at a given spaced axial distance from the extreme forward axial end of said tooth with said tooth for said given spaced axial distance being of conventional unindented construction, said given spaced axial distance being on the order of at least one-sixteenth of the outside diameter of said cutting portion.

3. A milling cutter blank as claimed in claim 2, wherein said given spaced axial distance is on the order of at least one-eighth the outside diameter of said cutting portion.

4. A milling cutter blank as claimed in claim 1, wherein said teeth extend in a helical direction at a given helix angle.

5. A milling cutter blank as claimed in claim 1, wherein said land surface is formed as an arc of a circle.

6. A milling cutter blank as claimed in claim 4, wherein said cutter blank is an end mill blank with a shank end portion connected to said cutting portion.

7. A milling cutter having an axis and having an improved cutting action including in combination a cutting portion, said cutting portion comprising a plurality of teeth extending in generally an axial direction, each said tooth having a cutting face side, a trailing side, and a land surface connecting the two aforementioned sides, said cutting face side having a constant positive radial rake relationship with the cutter axis, the intersection of said cutting face side and said land surface defining a cutting edge which is continuous substantially the entire axial length of said tooth, said land surface being relieved from said cutting face side in the direction of said trailing side, wall means on said cutting face side of said tooth defining a plurality of axially spaced indentations which are recessed toward said trailing side.

8. A milling cutter as claimed in claim 7, wherein said wall means which define said plurality of axially spaced indentations also define a plurality of axially spaced high areas and low areas when viewed in the radial direction of the milling cutter.

9. A milling cutter as claimed in claim 8, wherein said cutting edge when viewed in a direction generally at a right angle to said radial direction defines a plurality of connected curves having alternately high areas and low areas.

10. A milling cutter as claimed in claim 9, wherein said last mentioned high areas are generally flat on top.

11. A milling cutter as claimed in claim 8, wherein said cutting edge when viewed in a direction generally at a right angle to said radial direction defines substantially a straight line.

12. A milling cutter as claimed in claim 7, wherein said axially spaced indentations on said cutting face side of said tooth start at a given spaced axial distance from the extreme axial forward end of said tooth with said tooth for said given spaced axial distance being of conventional nonindented construction, said given spaced axial distance being on the order of at least one-sixteenth of the outside diameter of said cutting portion.

13. A milling cutter as claimed in claim 12, wherein said given spaced axial distance is on the order of at least one-eighth of the outside diameter of said cutting portion.

14. An end mill having an axis and having an improved cutting action including in combination a shank end portion and a cutting end portion, said cutting end portion comprising a plurality of teeth extending in a helical direction at a given helix angle, each said tooth having a cutting face side, a trailing side and a land surface connecting the two aforementioned sides, said cutting face side having a constant positive radial rake relationship with the end mill axis, the intersection of said cutting face side and said land surface comprising the cutting edge of said tooth, said cutting edge being continuous substantially the entire length thereof, wall means on said cutting face side of said tooth defining a plurality of axially spaced high areas and low areas when viewed in the radial direction of the end mill, said land surface extending in a manner to provide cutting relief for said cutting edge.

15. An end mill as claimed in claim 14, wherein said high areas and low areas start a given spaced axial distance from the extreme forward axial end of said tooth with said tooth for said given spaced axial distance being of conventional construction, said given space distance being on the order of at least one-sixteenth of the outside diameter of said cutting portion.

16. An end mill as claimed in claim 15, wherein said given axial distance is on the order of at least one-eighth of the outside diameter of said cutting end portion.

17. An end mill as claimed in claim 14, wherein said high and low areas are generally sinusoidal in configuration.

18. An end mill as claimed in claim 17, wherein said cutting edge when viewed in a direction generally at a right angle to said radial direction defining high areas and low areas which are generally sinusoidal in configuration.

19. An end mill as claimed in claim 14, wherein said high areas are substantially flat on top.

20. An end mill as claimed in claim 19, wherein said cutting edge when viewed in a direction generally at a right angle to said radial direction defining another curve with high areas and low areas with said high areas being substantially flat on top.

21. An end mill as claimed in claim 17, wherein said cutting edge when viewed in a direction generally at a right angle to said radial direction defines substantially a straight line.

22. An end mill as claimed in claim 21, wherein said straight line is substantially parallel to the axis of the end mill.

23. A rotating cutting tool having an improved cutting action comprising a cutting portion, said cutting portion having a plurality of spaced cutting edges, each of said spaced cutting edges following the path of a curve which defines alternate peaks and valleys, each of said peaks comprising a surface which is substantially flat, the depth from a peak to a valley being small as compared to the pitch distance between adjacent peaks.

24. A tool as claimed in claim 23, wherein said cutting edges are circumferentially spaced and helically extending.

25. A tool as claimed in claim 23, wherein said flat surface is substantially parallel with the axis of the tool.

26. A tool as claimed in claim 13, wherein said flat surface of a peak on one cutting edge is axially offset from a corresponding flat surface of a peak on an adjacent cutting edge.

27. A tool as claimed in claim 26, wherein the axial distance of a flat surface multiplied by the number of cutting edges is at least as great as said pitch distance.

28. A milling cutter as claimed in claim 7, wherein each of said cutting edges follows the path of a curve which defines alternate peaks and valleys, each of said peaks comprising a surface which is substantially flat, the depth from a peak to a valley being small as compared to the pitch distance between adjacent peaks.

29. A tool as claimed in claim 28, wherein said cutting edges are circumferentially spaced and helically extending.

30. A tool as claimed in claim 28, wherein said flat surface of a peak on one cutting edge is axially offset from a corresponding flat surface of a peak on an adjacent cutting edge.

31. A tool as claimed in claim 30, wherein the axial distance of a flat surface multiplied by the number of cutting edges is at least as great as said pitch distance.

* * * * *

UNITED STATES PATENT OFFICE
CERTIFICATE OF CORRECTION

Patent No. 3,775,819  Dated December 4, 1973

Inventor(s) Thomas A. Ribich

It is certified that error appears in the above-identified patent and that said Letters Patent are hereby corrected as shown below:

In Claim 26, Column 10, line 29. "13" should read "23".

Signed and sealed this 17th day of September 1974.

(SEAL)
Attest:

McCOY M. GIBSON JR.
Attesting Officer

C. MARSHALL DANN
Commissioner of Patents